US010069878B1

(12) United States Patent
Bastide et al.

(10) Patent No.: US 10,069,878 B1
(45) Date of Patent: Sep. 4, 2018

(54) AUDIOVISUAL NORMS FROM SHARED COMMUNITIES

(71) Applicant: INTERNATIONAL BUSINESS MACHINES CORPORATION, Armonk, NY (US)

(72) Inventors: Paul R. Bastide, Boxford, MA (US); Jonathan Dunne, Dungarvan (IE); Liam Harpur, Skerries (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/700,858

(22) Filed: Sep. 11, 2017

Related U.S. Application Data

(63) Continuation of application No. 15/494,963, filed on Apr. 24, 2017.

(51) Int. Cl.
  *H04N 7/15* (2006.01)
  *H04L 29/06* (2006.01)
  *H04N 7/14* (2006.01)

(52) U.S. Cl.
  CPC ...... *H04L 65/1089* (2013.01); *H04L 65/1076* (2013.01); *H04L 65/403* (2013.01); *H04L 65/605* (2013.01); *H04N 7/147* (2013.01); *H04M 2203/5081* (2013.01)

(58) Field of Classification Search
  None
  See application file for complete search history.

(56) References Cited

U.S. PATENT DOCUMENTS

| | | | |
|---|---|---|---|
| 5,758,079 A | 5/1998 | Ludwig et al. | |
| 8,605,872 B2 | 12/2013 | Mock | |
| 8,681,203 B1 | 3/2014 | Yin et al. | |
| 2008/0091692 A1 | 4/2008 | Keith et al. | |
| 2011/0096137 A1 | 4/2011 | Baker et al. | |
| 2013/0051543 A1 | 2/2013 | McDysan et al. | |
| 2013/0321340 A1 | 12/2013 | Sec et al. | |
| 2014/0362163 A1 | 12/2014 | Winterstein et al. | |
| 2015/0201237 A1 | 7/2015 | Seiden et al. | |
| 2015/0296061 A1 | 10/2015 | Geiger et al. | |
| 2016/0142451 A1 | 5/2016 | Ouyang et al. | |
| 2017/0048492 A1 | 2/2017 | Buford et al. | |
| 2017/0277376 A1 | 9/2017 | Bilinski et al. | |
| 2018/0035402 A1* | 2/2018 | Boss | H04W 68/005 |

OTHER PUBLICATIONS

IBM: List of IBM Patents or Patent Applications Treated as Related (Appendix P), Oct. 12, 2017, pp. 1-2.

(Continued)

*Primary Examiner* — Creighton Smith
(74) *Attorney, Agent, or Firm* — Robert D. Bean

(57) ABSTRACT

A processor-implemented method, computer system, and computer program product for managing a plurality of audio-visual teleconference distractions, including the detection of a new participant to a teleconference call; the monitoring of a stream of the detected new participant for a plurality of distraction markers; calculation of a level of distraction based on the plurality of distraction markers; and alterations performed on the monitored stream based on the calculated level of distraction satisfying a threshold.

1 Claim, 6 Drawing Sheets

(56) References Cited

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.

Authors, et al.: Disclosed Anonymously, "Intelligent Line Muting during Conference Call using Cognitive & Contextual Disturbance Techniques", IP.com, http://ip.com/IPCOM/000246023, An IP.com Prior Art Database Technical Disclosure, IP.com No. IPCOM000246023D, IP.com Electronic Publication Date: Apr. 26, 2016, pp. 1-3.

Bastide et al., U.S. Appl. No. 15/494,963, filed Apr. 24, 2017, titled "Audiovisual Norms From Shared Communities", pp. 1-31.

\* cited by examiner

AUDIOVISUAL NORMS FROM SHARED COMMUNITIES

BACKGROUND

The present invention relates, generally, to the field of computing, and more particularly to the field of teleconferencing.

Teleconferencing involves a call, which may be audio or visual, over a telecommunications network and allows multiple participants to converse with each other simultaneously. Teleconferencing is frequently used by businesses to allow group interactions between employees, clients, and business partners who, for reasons of convenience or cost, cannot meet together in the same geographical location. Additionally, teleconferencing can be used in conjunction with web services to allow participants on the call to see video feeds of the other participants, or to display websites, presentations or programs to all participants.

SUMMARY

A processor-implemented method, computer system, and computer program product for managing a plurality of audio-visual teleconference distractions, including the detection of a new participant to a teleconference call; the monitoring of a stream of the detected new participant for a plurality of distraction markers; calculation of a level of distraction based on the plurality of distraction markers; and alterations performed on the monitored stream based on the calculated level of distraction satisfying a threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
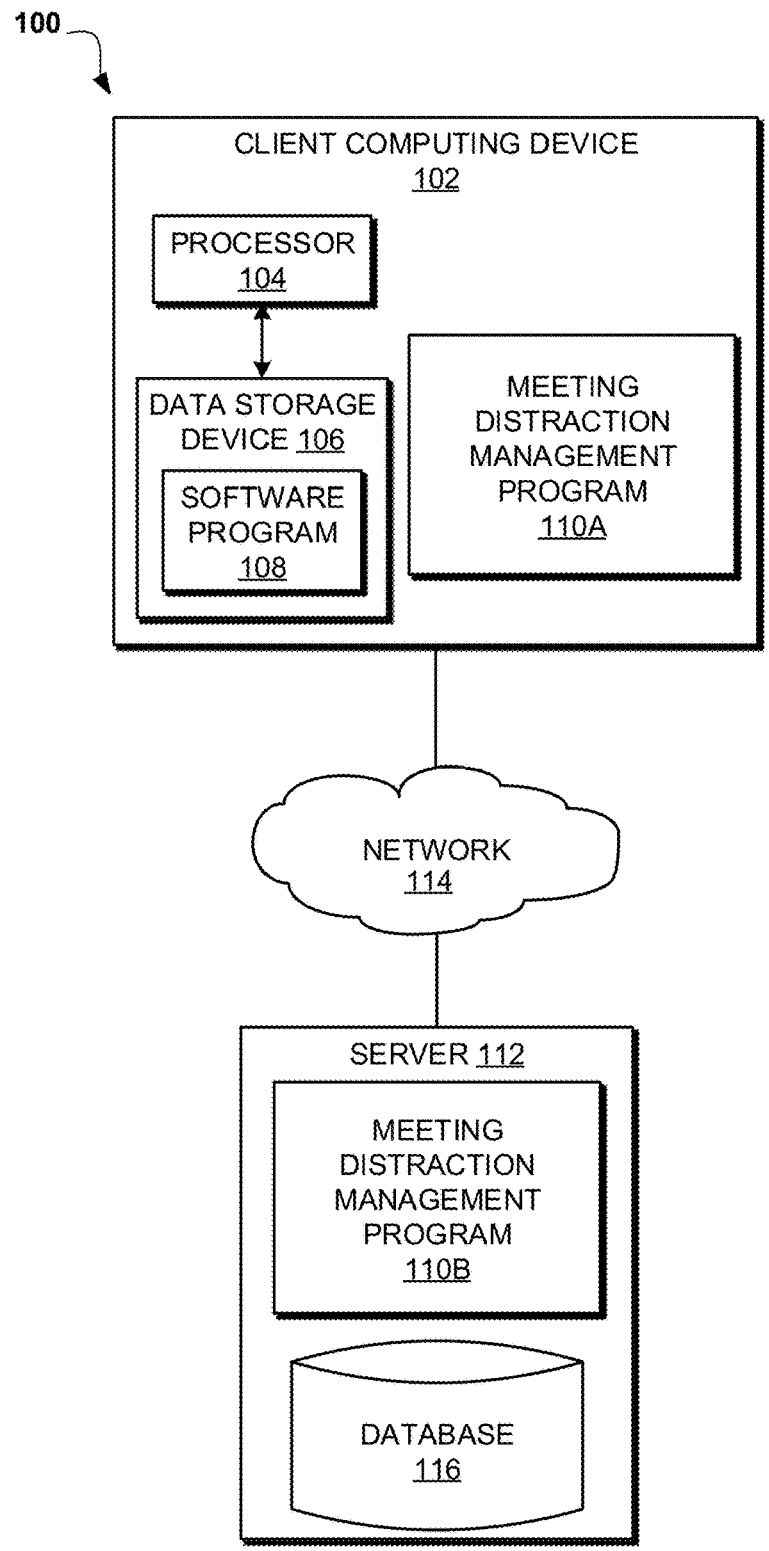
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to teleconferencing. The following described exemplary embodiments provide a system, method, and program product to, among other things, reduce distraction caused by undesirable audiovisual elements in a teleconference. Therefore, the present embodiment has the capacity to improve the technical field of teleconferencing by automatically identifying distractions in a context-sensitive fashion, and eliminating or minimizing such distractions to ensure that meetings remain as focused and productive as possible.

As previously described, teleconferencing involves a call over either a telecommunications network or the internet and allows multiple participants to converse with each other simultaneously. Teleconferencing is frequently used by businesses to allow group interactions between employees, clients, and business partners who, for reasons of convenience or cost, cannot meet together in the same geographical location. Additionally, teleconferencing can be used in conjunction with web services to allow participants on the call to see video feeds of the other participants, or to display websites, presentations or programs to all participants.

Meetings and conference calls may be a great way to do business. Meeting owners setup meetings with audiovisual capabilities to facilitate communication between participants, understanding of important topics and the advancement of business objectives. However, meeting participants often are impeded in their efforts to pursue business-related goals over the course of a teleconference where conflicts of attention arise; frequently, callers may introduce distracting audio elements to the call, such as coughing, whispering, drumming on the table, or other background sounds. In audiovisual conference calls, meeting participants may introduce distracting visual elements to the call, such as by conducting a presentation with distracting symbols or browser windows, or by calling from a location that is exotic, busy, and/or contains distractions, such as animals, symbols, or other people in the background. As such, it may be advantageous to, among other things, implement a system that can eliminate or minimize these audio and visual distractions to maximize focus in meetings and thereby facilitate the achievement of the business objective.

According to one embodiment, a system for managing audio-visual meeting distractions by detecting new participants to a video call, and monitoring the communities and shared communities of detected participants for behaviors and attributes may be introduced. The video call may be monitored for associated behaviors and attributes, including likely distraction markers, and calculating the level of distraction based on these distraction markers. Furthermore, the video stream of the participant may be altered based on the determined distraction markers and a threshold.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to minimize audio-visual distraction elements in conference calls, which is capable of detecting participants to a call, monitoring their call stream for distraction elements, and automatically modifying the call stream to minimize or remove distraction elements.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a meeting distraction management program 110A and communicate with the server 112 via the communication network 114, in accordance with one embodiment of the invention. Client computing device 102 may be, for example, a mobile device, a teleconferencing set, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, teleconferencing set, netbook computer, personal computer (PC), a desktop computer, or any programmable electronic device or any network of programmable electronic devices capable of hosting and running meeting distraction management program 110B and a database 116 and communicating with the client computing device 102 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, software program 108 may be a teleconferencing program capable of allowing multiple users to interact with each other through a visual or auditory medium, or a combination of both. Software program 108 may allow multiple users to interact through such means as file, program or presentation sharing, audio streams, or video feed of each user. Software program 108 may be configured to accept data from a sensor, such as a camera or microphone, which is in communication with client computing device 102 or stores data in a repository, such as database 116 or data storage device 106, which is accessible to client computing device 102. In an alternate embodiment, software program 108 may be hosted and run on server 112.

The meeting distraction management program 110A, 110B may be a program capable of interfacing with software program 108, monitoring the call stream of the user for distraction markers, calculating distraction markers or altering the call stream of the user. Meeting distraction management program 110A, 110B may be further capable of accessing data stored in repositories either on the client computing device 102, such as data storage device 106, on server 112, such as database 116, or over network 114. This data may include stored information about the user, including groups the user is a part of, distraction preferences for such groups, and the individual preferences of the user with regard to distraction management. Additionally, meeting distraction management program 110A, 110B may be hosted on client computing device 102, server 112, or on some combination of devices. The meeting distraction management method is explained in further detail below with respect to FIG. 2.

Figure 2:
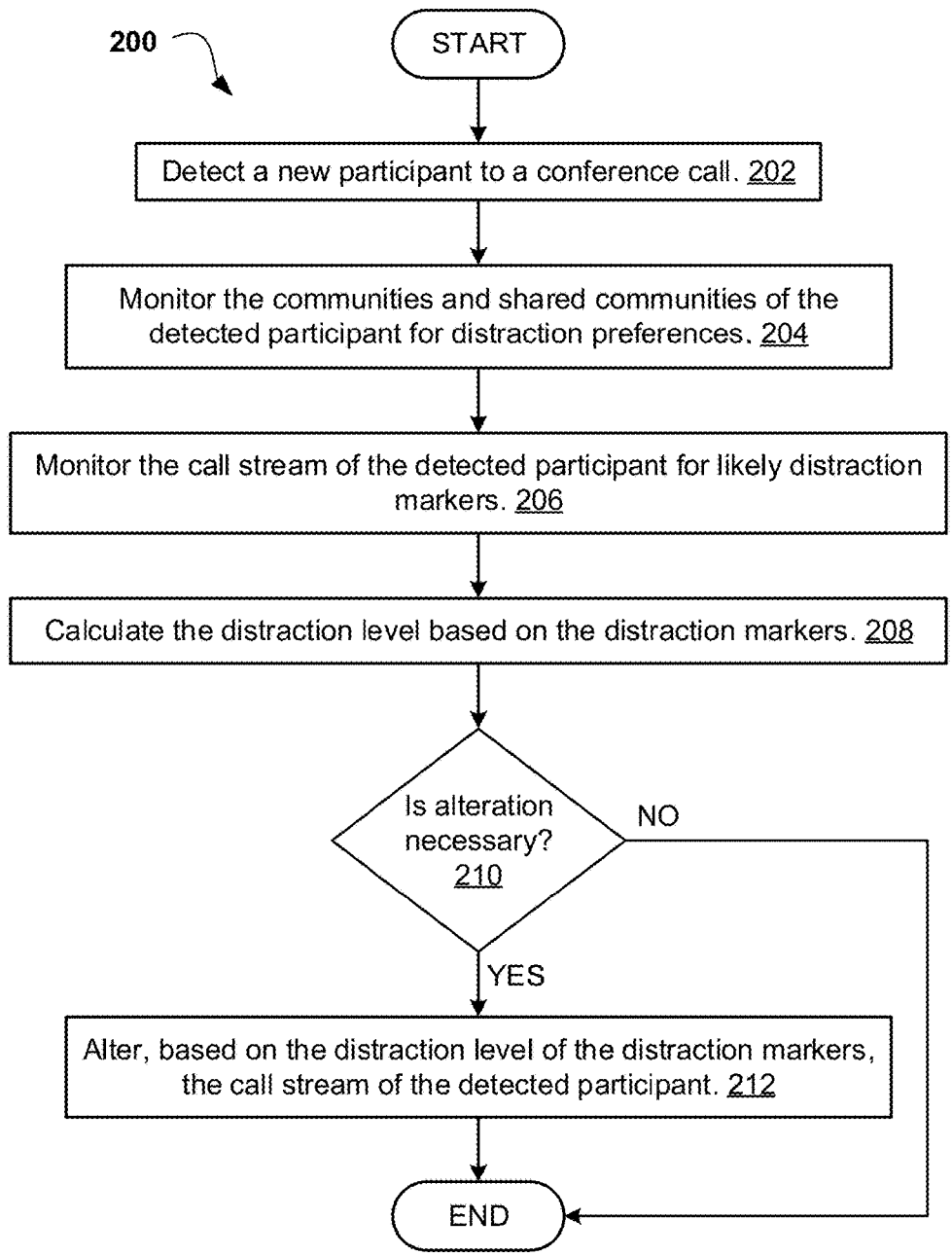
FIG. 2 is an operational flowchart illustrating an audio-visual meeting distraction management process according to at least one embodiment.

Referring now to FIG. 2, an operational flowchart illustrating an audiovisual meeting distraction management process 200 is depicted according to at least one embodiment. At 202, the meeting distraction management program 110A, 110B detects a new participant to a conference call. Meeting distraction management program 110A, 110B detects a new participant to a conference call by establishing a connection with the session initiation protocol of the teleconferencing program, such as software program 108. Meeting distraction management program 110A, 110B may also establish a connection with the menu system or the invite system of the teleconferencing program to determine when a new participant is added to the call. In an alternate embodiment, meeting distraction management program 110A, 110B may detect a new user based on utterances, visual gestures (such as waving), haptic gestures (such as pinch-zoom), or low level audio that is associated with a video call.

Next, at 204, the meeting distraction management program 110A, 110B monitors the communities and shared communities of the detected participant for distraction preferences. Communities may be any online group from which distraction preferences may be extracted or inferred. Such communities may be extant groups on online resources such as LinkedIn® (LinkedIn® and all LinkedIn® based trademarks and logos are trademarks or registered trademarks of LinkedIn Corporation and/or its affiliates), Facebook® (Facebook® and all Facebook® based trademarks and logos are trademarks or registered trademarks of Facebook and/or its affiliates), or Slack® (Slack® and all Slack® based trademarks and logos are trademarks or registered trademarks of Slack Technologies and/or its affiliates), or may be files where distraction preferences are saved, or may be groups created for the purposes of a specific call. The distraction preferences of the community may consist of such elements as changing the context of what is considered a distraction marker; for instance, if the community is a developer group, and the call stream contains a poster containing the logo of a programming language which would otherwise be considered to be a distraction marker, the meeting distraction management program 110A, 110B may not flag the poster as a distraction marker in light of the fact that the call participants are all part of a development group to which the poster is contextually relevant. In another example, if developers are in a video call and one developer has a beach scene in the background, and through analysis of the shared community a beach scene is not seen to be evident in the studied communities, then that object may be marked as a distraction. Meeting distraction management program 110A, 110B may apply the distraction preferences of each community of which a call participant is a member, or apply the distraction preferences of those communities that the call participant shares with some or all of the other call participants. Distraction preferences may be applied uniformly to the entire call or may be applied to each call stream based on that individual call participant's distraction preferences.

Then, at 206, the meeting distraction management program 110A, 110B monitors the conference call for likely distraction markers. Distraction markers may include such elements as multiple people not looking at the camera or screen, multiple colors in the background, abnormal objects for a given user (such as beach, trees, or sunglasses in a business meeting) or actions in the background that are not related to a meeting. These distraction markers may be negotiated based on a consensus algorithm; for instance, if two-thirds of attendees define a factor as distracting, then the meeting distraction management program 110A, 110B applies a rule to that factor. The distraction markers may also be determined by a system, a company or a group, or may be further set by hierarchy or based on ownership of the meeting or the current agenda item. The meeting distraction management program 110A, 110B may conduct monitoring based on keyframes, frames audio transition from speaker to speaker, or every frame. To reduce processing overhead, heuristics may be employed to optimize the amount of frames or audio that need to be monitored. Meeting distraction management program 110A, 110B may also monitor the audio for indicators of distraction markers; for example, if a call participant mentions a cool poster in another call participant's video stream, meeting distraction management program 110A, 110B may recognize the poster as a distraction marker and react accordingly.

Next, at 208, the meeting distraction management program 110A, 110B calculates the level of distraction based on the distraction markers. The level of distraction may be calculated based on the sum of the weight assigned to each distraction marker. The weight assigned to each distraction marker may vary in magnitude based on the relative severity of the distraction caused. This weight may be calculated based on a standard deviation or an interpolation of the deviation. For video calls, the distraction markers may be weighted in proportion to the area of the video feed that is taken up by the distracting content. For instance, if the video call contains four callers, with the screen divided into four quarters each containing the video stream of a user, and one caller's video stream contains distracting content, the meeting distraction management program may calculate the level of distraction to be 25%. The meeting distraction management program 110A, 110B may also apply a weight to the distractions in accordance with the impact and eye-sight of other participants, and whether participants are dwelling on the distractions.

Then, at 210, the meeting distraction management program 110A, 110B determines if alteration is necessary. Meeting distraction management program 110A, 110B determines if an alteration is necessary by checking to see if the distraction level exceeds a threshold. This threshold may be determined by a system, a company or a group, or may be further set by hierarchy or based on ownership of the meeting or the current agenda item. The threshold may also be a dynamic value that takes information into account in real time. For instance, the meeting distraction management program 110A, 110B may take into account the trajectory of the distraction level; in the event that the distraction level is rising, the program may decrease the threshold to increase the importance of action being taken. According to one implementation, the audio-visual meeting distraction management process 200 may continue along the operational flowchart, if the distraction level exceeds the threshold. If the meeting distraction management program 110A, 110B determines that the distraction level does not exceed the threshold (step 210, "NO" branch), the meeting distraction management program 110A, 110B may terminate. If the meeting distraction management program 110A, 110B determines that the distraction level does exceed the threshold (step 210, "YES" branch), the meeting distraction management program 110A, 110B may advance to step 212 to alter the call stream of the detected participant. In an alternate embodiment, if meeting distraction management program 110A, 110B determines that the distraction level does not exceed the threshold (step 210, "NO" branch), the meeting distraction management program 110A, 110B may proceed back to step 202 to resume detection of new participants to the conference call.

Next, at 212, the meeting distraction management program 110A, 110B alters, based on the distraction level of the distraction markers, the call stream of the participant. Alterations to audio may include muting audio altogether for callers that are judged to be distracting. For instance, if meeting distraction management program 110A, 110B detects a loud and persistent hammering sound in the call stream of a participant, the program may remove this distraction by muting that call participant's audio. Alterations to video may include dropping the call signal for the distracting person during the distraction period, degrading video quality such that the distraction element is no longer easily discernable, selectively blurring or occluding regions of the video containing distracting elements, resizing the sharing/screen size based on the level of distraction, or degrading the video call to audio only. An example of occluding a distracting video element is shown in FIG. 3.

It may be appreciated that FIG. 2 provides only an illustration of one implementation and does not imply any limitations with regard to how different embodiments may be implemented. Many modifications to the depicted environments may be made based on design and implementation requirements. For instance, in an alternate embodiment, meeting distraction management program 110A, 110B may notify a user of the presence of distraction elements prior to altering the call stream and may highlight the distractions in the video stream, or may highlight audio, such as whispering, coughing, or drumming on the table. In a further embodiment, the meeting distraction management program 110A, 110B may assess distraction elements in the call stream prior to the caller appearing in the call, notify the call host of distraction elements prior to the participant joining the call, and may even prevent the participant from joining the call.

Figure 3:
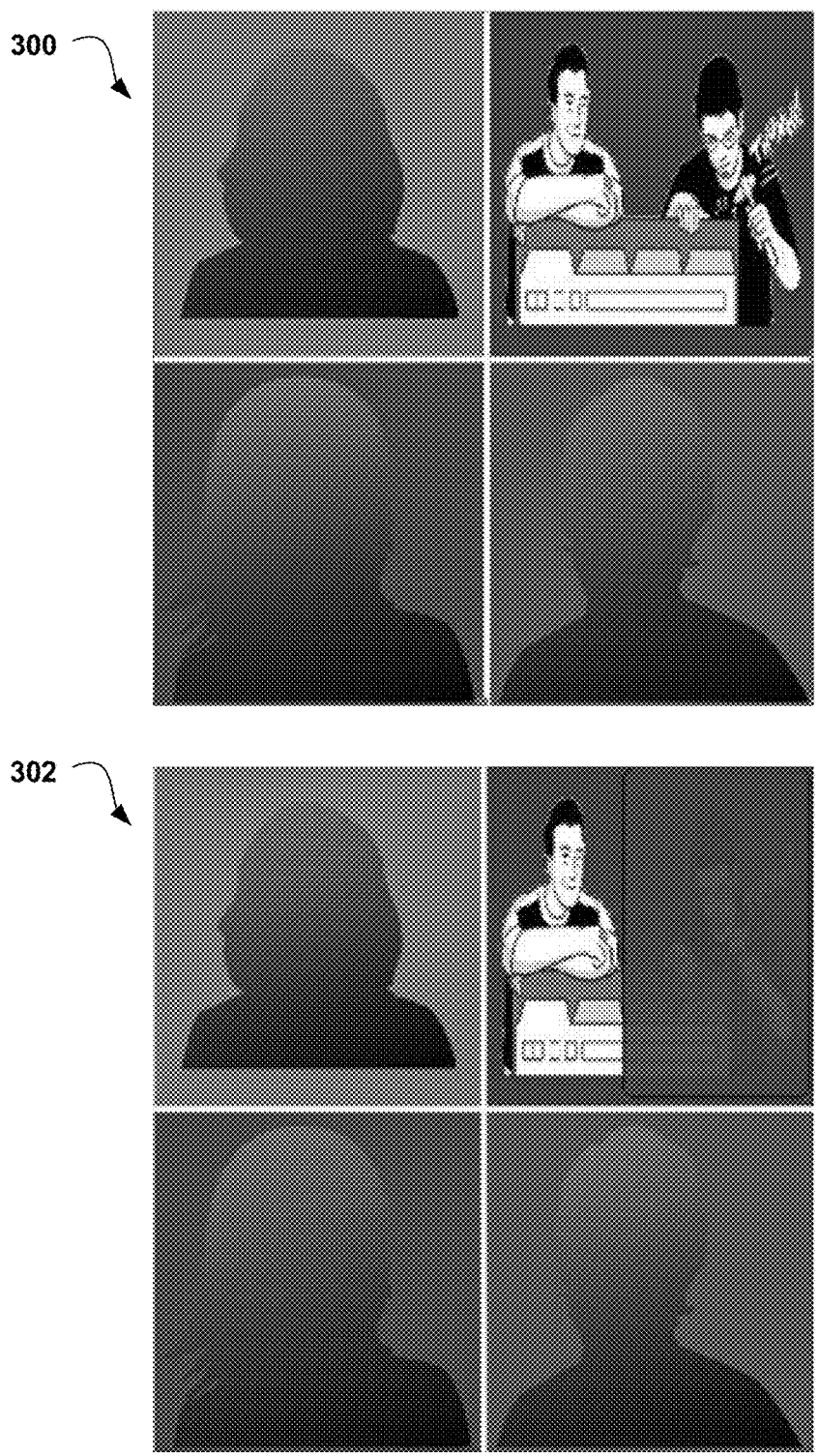
FIG. 3 illustrates an alteration to the video stream by an audio-visual meeting distraction management process according to at least one embodiment.

FIG. 3 illustrates an alteration to the video stream by an audio-visual meeting distraction management process according to at least one embodiment. At 300, a video call is depicted where the top right call participant has included in his video feed a second person who is engaged in activity ancillary to the business purpose of the call and who is not participating in the call. This may be considered by meeting distraction management program 110A, 110B to be a distraction element. At 302, the top right call participant's video feed has been altered to occlude the offending distraction element. Meeting distraction management program 110A, 110B may also have dropped the call signal for the top right call participant until the second person left, degraded the video quality to obfuscate the second person, or resizing the top right participants' window to reduce the prominence and thereby the distractive potential of the second person in the screen.

Figure 4:
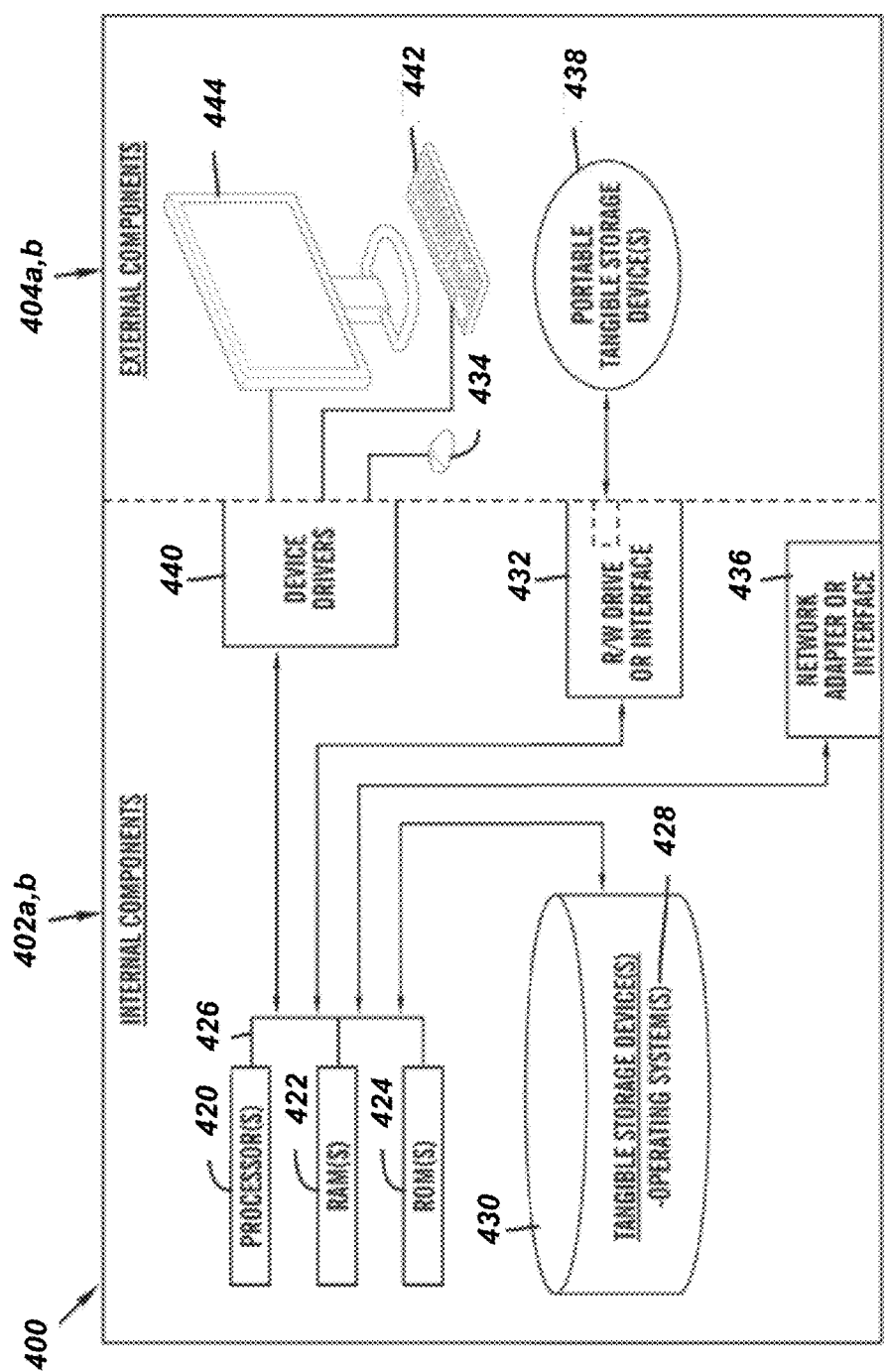
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the meeting distraction management program 110A in the client computing device 102, and the meeting distraction management program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the meeting distraction management program 110A in the client computing device 102 and the meeting distraction management program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the meeting distraction management program 110A in the client computing device 102 and the meeting distraction management program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
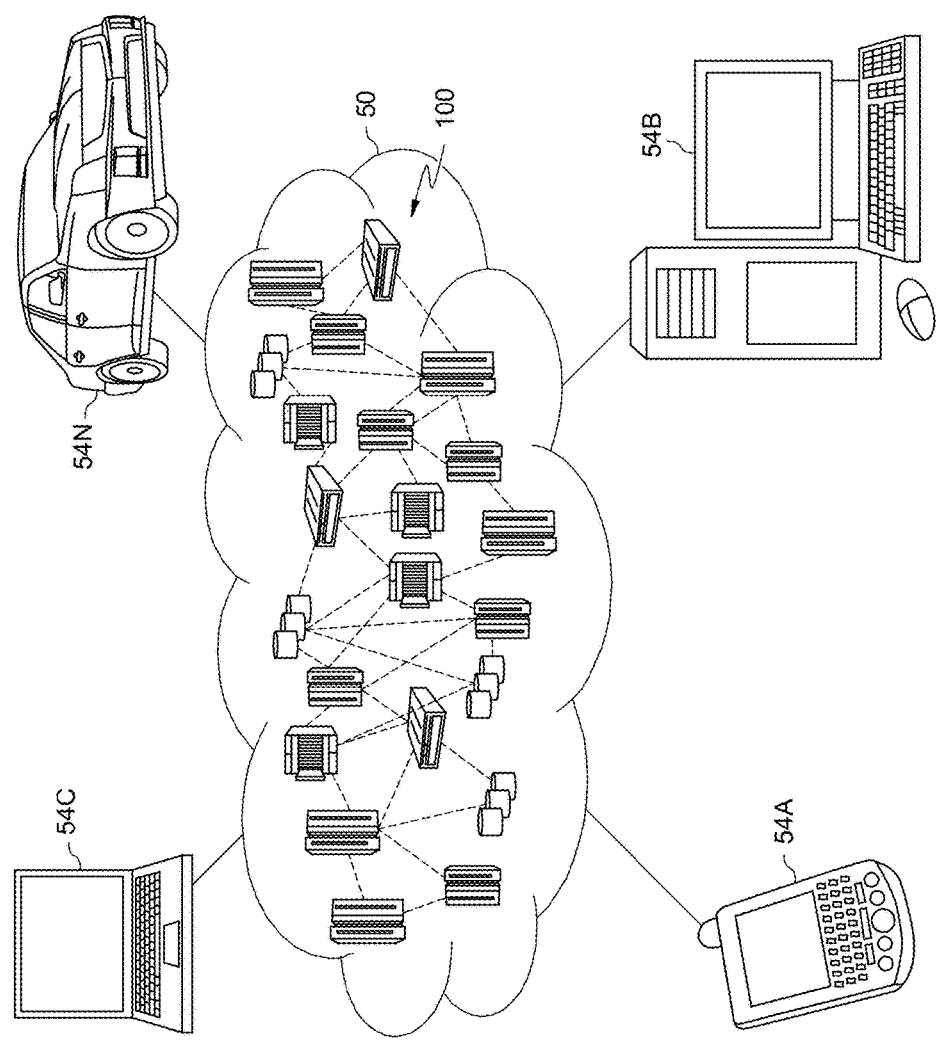
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 6:
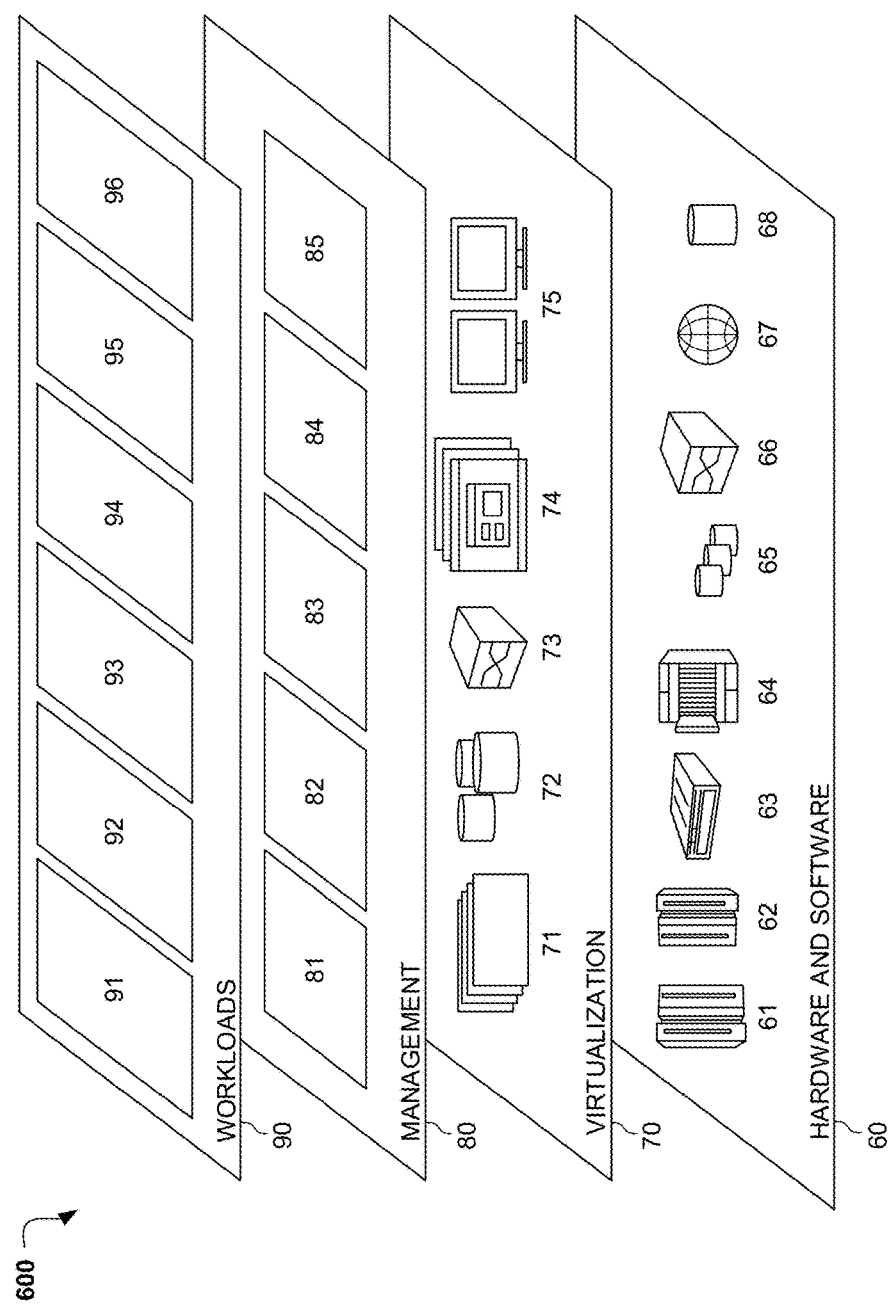
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio-visual meeting distraction management 96. Audio-visual meeting distraction management 96 may relate to analyzing both the audio and video of the call streams of participants in a teleconference for sources of distraction, and altering the call streams to eliminate or minimize distractions that exceed pre-established thresholds.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for managing a plurality of audio-visual teleconference distractions, the method comprising:
    detecting a new participant to a teleconference call by establishing a connection with one or more session initiation protocols, one or more menu systems, or one or more invite systems of one or more teleconferencing programs;
    defining a plurality of distraction markers comprising a set of distraction preferences by a means selected from a list consisting of: consensus of call participants, determination of a program, and determination by the owner of the call;
    applying the set of distraction preferences to one or more members of the call;
    monitoring, based on keyframes, audio, audio transition from speaker to speaker, and every frame, a stream of the detected new participant for one or more distraction markers selected from a list consisting of: multiple people not looking at the camera or screen, multiple colors in the background, abnormal objects for a given user, or actions in the background that are not related to a meeting;
    calculating a level of distraction based on a weight of the plurality of distraction markers, where the weight is calculated based on a means selected from a list consisting of: standard deviation, interpolation of the deviation, the relative severity of the distraction caused, an amount of screen area taken up by the distraction marker, an impact and eye-sight of other participants, and whether participants are dwelling on the distraction marker; and altering the monitored stream based on the calculated level of distraction satisfying a threshold, where the threshold is pre-determined by a system, company, group, hierarchy, call owner, or program.

* * * * *